June 21, 1938.     O. P. HAEGELE     2,121,227
WEIGHING APPARATUS
Filed May 2, 1936     6 Sheets-Sheet 2
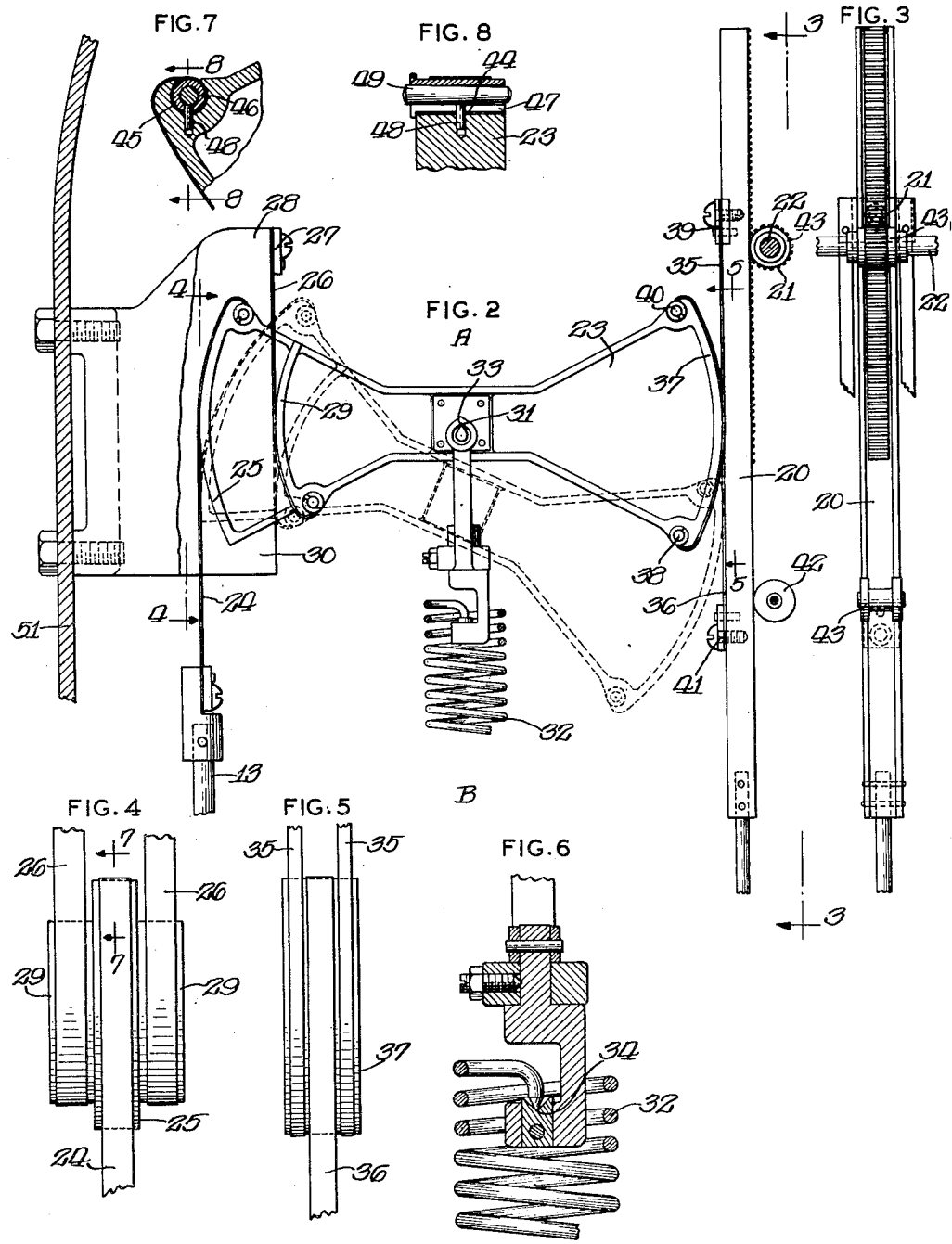
Inventor:-
Otto P. Haegele,
By Roland C. Rehm Atty.

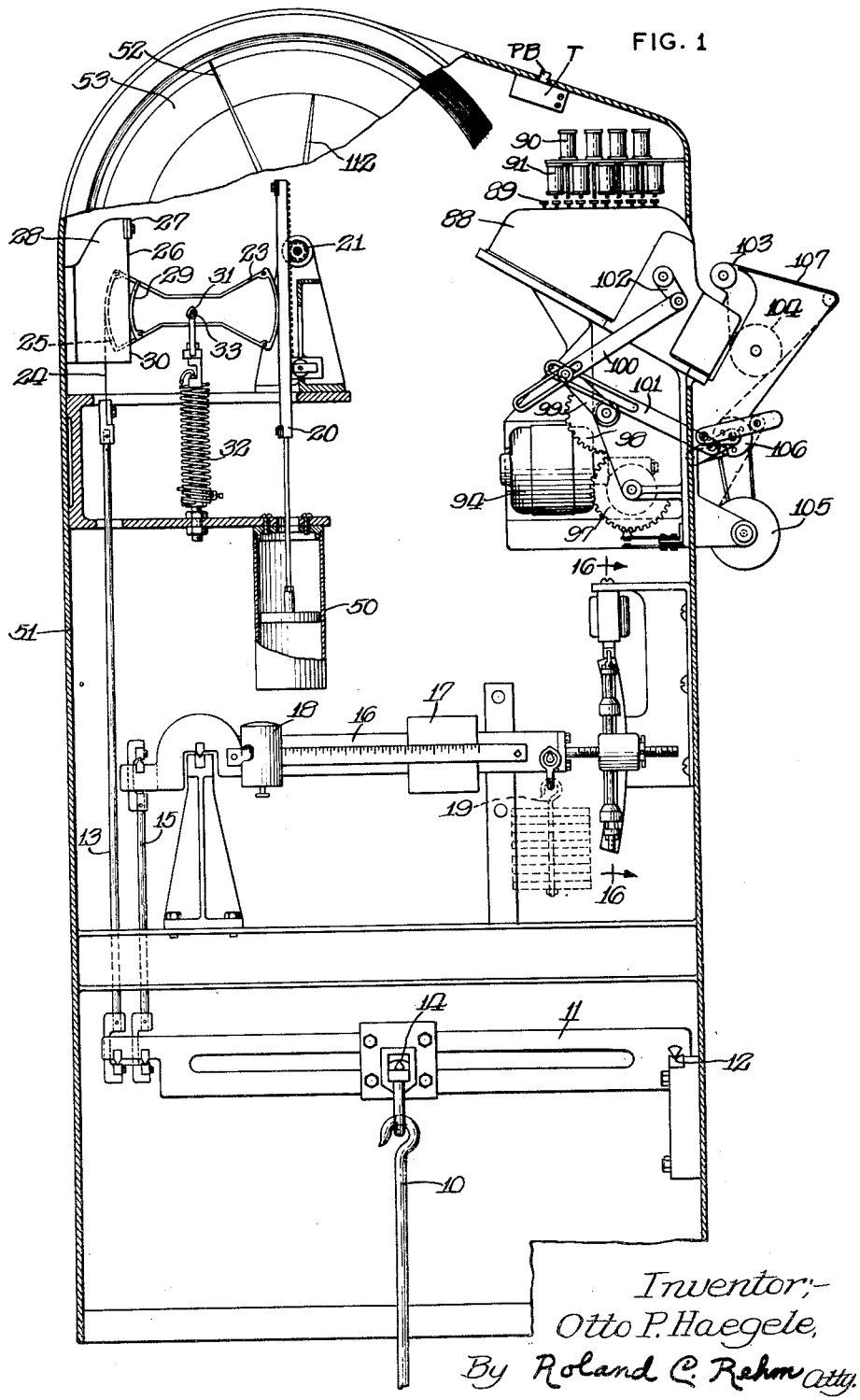

June 21, 1938. O. P. HAEGELE 2,121,227
WEIGHING APPARATUS
Filed May 2, 1936 6 Sheets-Sheet 3
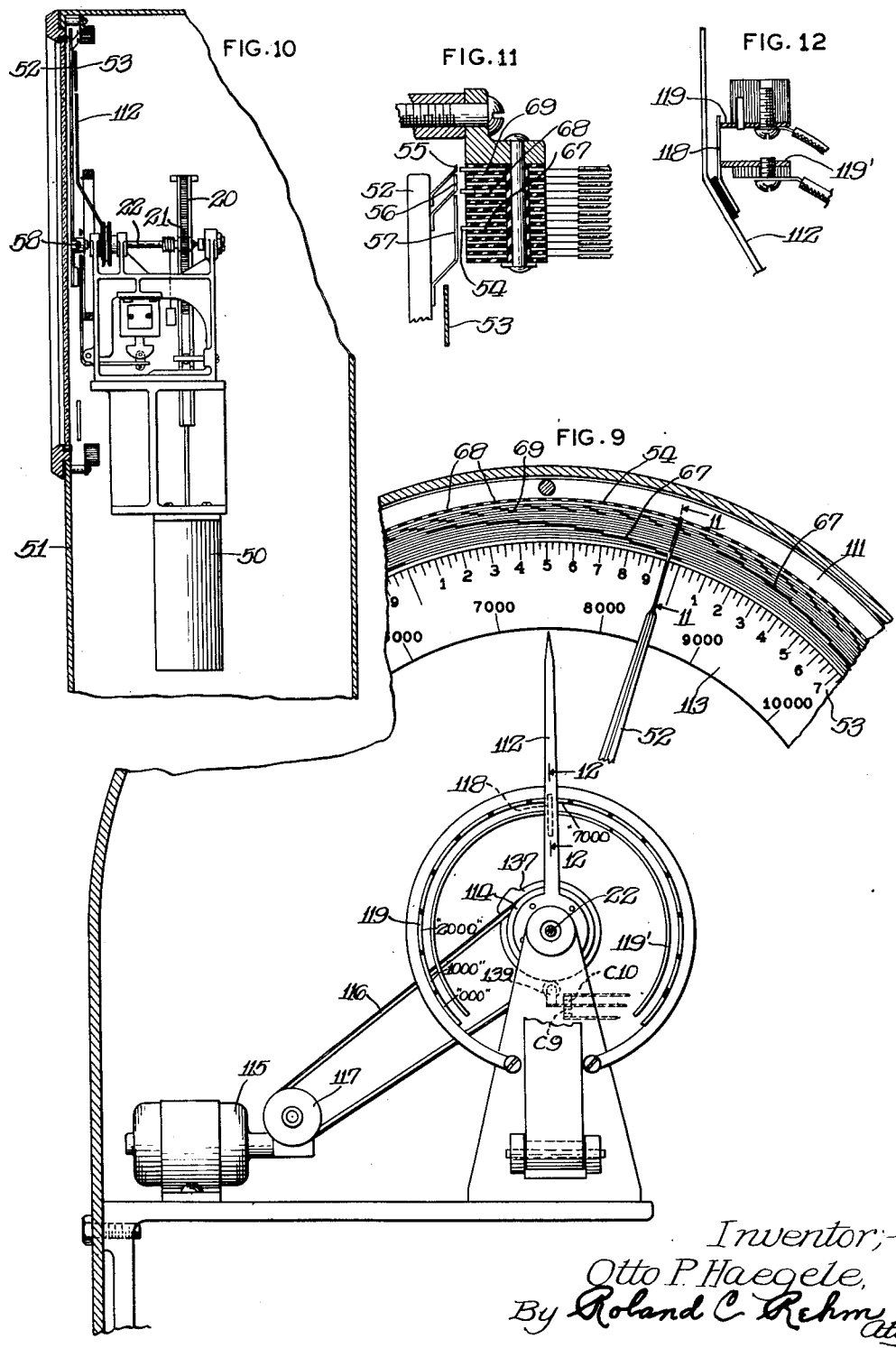

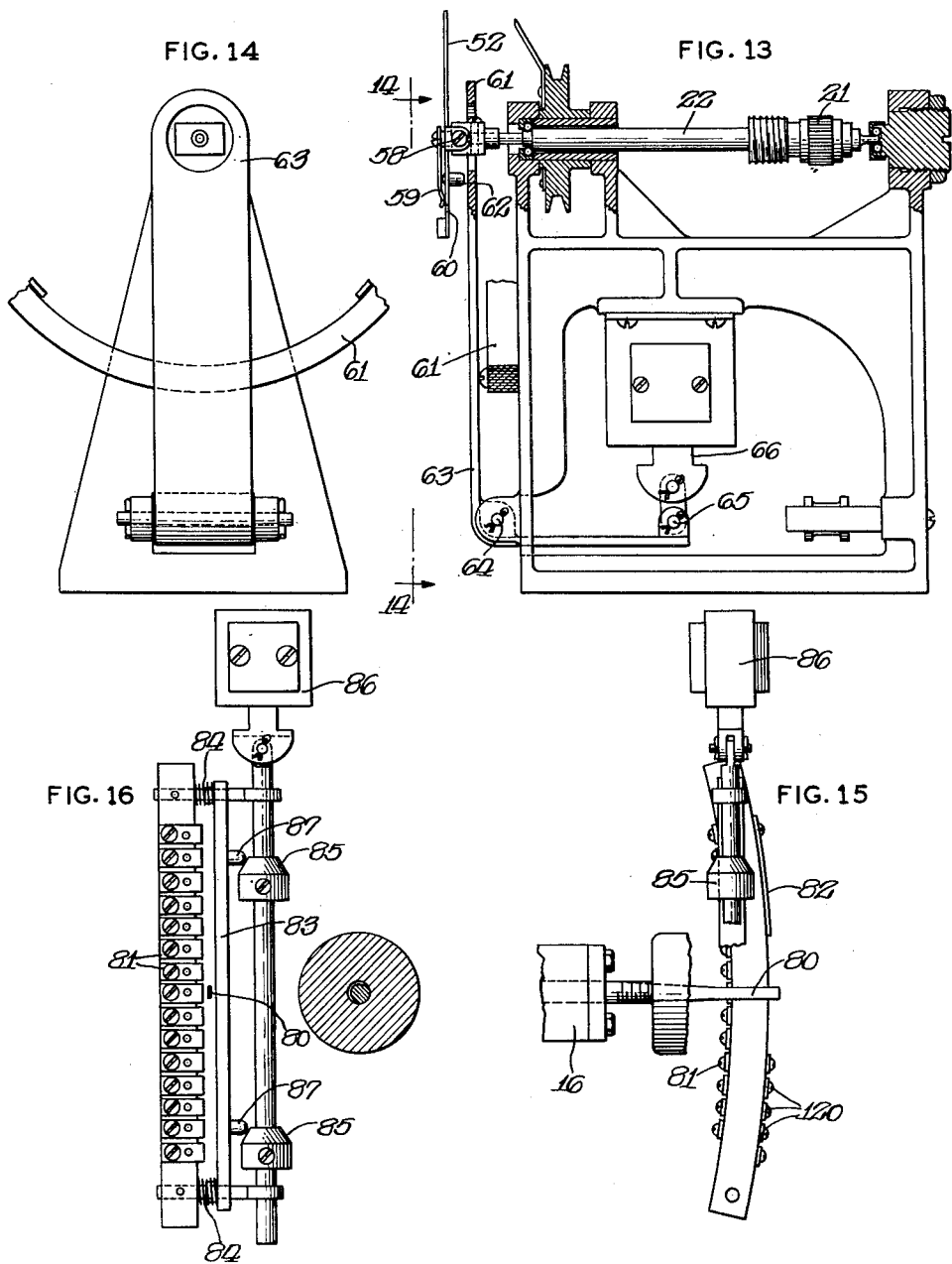

June 21, 1938. O. P. HAEGELE 2,121,227
WEIGHING APPARATUS
Filed May 2, 1936 6 Sheets-Sheet 5

Inventor;-
Otto P. Haegele,
By Roland C. Rehm Atty.

June 21, 1938.  O. P. HAEGELE  2,121,227
WEIGHING APPARATUS
Filed May 2, 1936  6 Sheets-Sheet 6

FIG. 19

Inventor;
Otto P. Haegele,
By Roland C. Rehm
Atty.

Patented June 21, 1938

2,121,227

UNITED STATES PATENT OFFICE 2,121,227

WEIGHING APPARATUS

Otto P. Haegele, Chicago, Ill., assignor to Streeter-Amet Company, Chicago, Ill., a corporation of Illinois Application May 2, 1936, Serial No. 77,520

10 Claims. (Cl. 265—5)

This invention relates to weighing scales and, among other objects, aims to provide improved and simplified means for automatically recording the weights of loads on the scale.

The invention may be readily understood by reference to one illustrative apparatus embodying the invention and shown in the accompanying drawings.

In said drawings:

Fig. 1 is an elevation, partly in section, of the apparatus, the enclosing housing therefor having been partially sectioned away to illustrate the mechanism on the interior;

Fig. 2 is a front elevation, on a somewhat larger scale, of the lever system for translating the pull of the load at an appropriate constant ratio to the dial indicator shaft;

Fig. 3 is a side elevation taken approximately from the plane 3—3 of Fig. 2 showing the dial shaft pinion and its operating rack;

Fig. 4 is an elevation taken approximately from the plane 4—4 of Fig. 2 showing the arrangement of tapes at one end of the floating lever;

Fig. 5 is a similar elevation, taken approximately from the plane 5—5 of Fig. 2, showing the arrangement of tapes at the other end of the floating lever;

Fig. 6 is an enlarged view showing the connection of the spring to the lever system;

Fig. 7 is a detail sectional view taken approximately on the plane 7—7 of Fig. 4 showing the manner of anchoring one of the tapes to the rocking lever;

Fig. 8 is a section taken on the plane 8—8 of Fig. 7;

Fig. 9 is a fragmentary elevation on a somewhat enlarged scale, of the weight indicating dial and associated mechanism;

Fig. 10 is a side elevation, partly in section, of the dial, dial shaft and associated mechanism;

Fig. 11 is a detail section, taken on the plane 11—11 of Fig. 9, of a portion of an indicator pointer and the electrical contacts associated therewith;

Fig. 12 is a similar section taken on the plane 12—12 of Fig. 9 showing the electrical contacts associated with another indicator pointer;

Fig. 13 is a side elevation on a larger scale than that of Fig. 10 and showing a portion of the mechanism therein illustrated;

Fig. 14 is a front elevation taken approximately from the plane 14—14 of Fig. 13 showing the contact making mechanism;

Fig. 15 is a side elevation of the extremity of a scale beam and associated contact mechanism;

Fig. 16 is an end elevation on the same scale taken approximately from the plane 16—16 of Fig. 1;

Fig. 19 is a diagrammatic view of the electrical system for controlling the operation of the apparatus.

Figure 17:
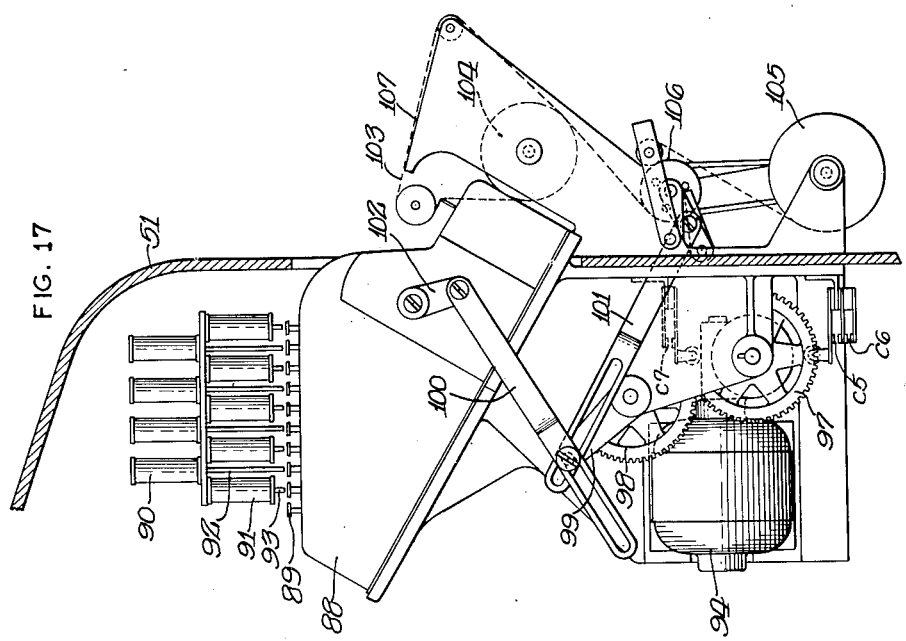
Fig. 17 is a side elevation, on a larger scale than that of Fig. 1, of the recording apparatus.

The translation of the weight of the load on a scale into a printed record has heretofore required expensive and involved mechanism. Unless the scale carried a printing wheel or disk provided with printing characters, step cams or the like operated by the scale have been required to set the recording mechanism. There have been objections to both types of recording mechanisms which it is unnecessary to enumerate here. In the illustrative apparatus, the scale is not burdened by the operation of a type wheel or the like and the intervening mechanism for setting the recording apparatus has been eliminated. By the use of electrical means, the load indicating position of the scale is translated directly into a printed record of the load.

The lever mechanism for transferring the force of the load to the indicating and recording mechanism is generally similar to that disclosed in the co-pending application of Olin H. Basquin et al, Serial No. 69,080. The pull of the load is communicated from the scale platform (which may be of conventional design and is not here shown) by the steel yard 10 to a so-called shelf lever 11 fulcrumed at 12 and connected at its other end through appropriate knife edge with tension rod 13. The knife edge 14 by which the steel yard is fulcrumed to lever 11 is advantageously made longitudinally adjustable of lever 11 to vary the ratio between the pull transmitted by rod 10 and rod 13. This makes it possible to adapt the apparatus without redesign or extensive alteration to a large range of scale platform lever ratios. Also connected to lever 11 through tension rod 15 is a tare beam 16 carrying the usual tare poises 17 and 18 by which the scale may be adjusted to varying tare loads. For the purpose of testing the scale, the tare beam is provided with a knife edge for supporting one or more test weights 19.

Movement of the lever system responsive to and in counterbalancing a load on the scale is multiplied to secure substantial unit increments of movement for operating the recording mechanism as presently described. As here shown, the pull of the net load is transmitted by rod 13 and a rocking lever 23 of the type disclosed in said Basquin application, to the rack bar 20 which rotates pinion 21 and its shaft 22. Rod 13 is connected to the lever through an intermediate flexible steel tape 24 which winds and unwinds upon the arcuate surface 25 of the lever. The lever is supported by tapes 26 anchored at 27 on the bracket 28, which operate upon the arcuate surfaces 29 of the lever, causing it in effect to roll upon the vertical surfaces 30 of bracket 28. Surfaces 29 in this instance are formed on a radius whose center is at 31. The pull of rod 13 is in this instance counterbalanced by spring 32 connected by appropriate knife edge pivot 33 to the rocker at the center 31. In operation of the lever, the pivot 33 thus travels in a straight line A—B parallel to the surface 30.

Also as disclosed in said Basquin application, spring 32 has a swivel connection 34 (see Fig. 6) with the rocker, thus allowing the spring to rotate axially slightly as it elongates and contracts.

The opposite end of the lever is connected to rack bar 20 by tapes 35 and 36 which operate on arcuate surface 37 whose center is also at 31 (Fig. 2). Tapes 35 are connected to the lever at 38 and to the rack bar at 39; and the intermediate tape 36 is connected to the lever at 40 and to the rack bar at 41. The rack bar is guided to move in a straight line by the pinion 21 and guide roll 42, both of which have pitch line flanges 43, which establish a line of movement for the rack which is tangential at all times to the pitch circle of pinion 21. Thus, as explained in greater detail in said Basquin application, the rack bar 20 has a multiplied movement in a path tangential to the arc of lever 23, which is exactly proportional at all parts of the cycle to the movement of rod 13. Assuming spring 32 to elongate and contract in accordance with Hooke's Law, the movement of rack bar 20 will be exactly proportional to the pull of rod 13 and to the load on the scale.

In Figs. 7 and 8 is illustrated an advantageous means for anchoring tapes 24, 25 etc. to the rocking lever. As here shown, the tapes are perforated at 44 adjacent their extremities which are curled into a cylindrical opening 45 in the lever around a slotted sleeve 46. The sleeve 46 may be introduced after the ribbon has been positioned with the slot 47 therein straddling pin 48. Thereafter, when pin 48 is in alignment with and passes through perforation 44, a tapered pin 49 is driven into the sleeve 46, anchoring pin 48 in place and expanding the sleeve to bind the tape tightly in place.

A dashpot 50 operates to dampen the oscillations of the system and to bring the scale to balance quickly. It is here shown directly connected to rack bar 20 (Fig. 1).

The foregoing apparatus is advantageously surrounded by a closed housing 51 which is heated by thermostatically controlled heating means, such as electric lamps, which maintain the interior of the housing at a uniform temperature, thereby avoiding variation in operation through changes in the spring 32 and tapes 24, 25, etc. It will be understood that other load offsetting means, such as a pendulum, may be substituted for spring 32.

It is apparent from the foregoing that the rotation of shaft 22 is proportional to the load on the scale and that the displacement of the arm 52 connected thereto represents the weight of the net load on the scale. Arm 52, which in this instance is in the form of a pointer associated with dial 53 for the purpose of giving visual indication of the load, travels over a series of electrical contact segments 54, arranged to represent the various digits in the weight of the load. The contacts are advantageously mounted and held in an appropriate insulating material, as shown in Fig. 11. The pointer carries contact making fingers 55, 56, and 57 adapted to engage the respective contacts but which normally travel free of such contacts to leave the pointer 52 entirely free of any restraint when displaced to a position representing the weight of the load.

The relative movement between the contacts 54 and the pointer, necessary to make electrical contact, is in this instance effected by hinging pointer 52 at 58 to shaft 22, thereby allowing a limited movement of the pointer toward and away from the contacts 54 (see Fig. 13). The pointer is normally held out of such contact by a flat spring 59 mounted at the hinge and bearing against the oppositely projecting portion 60 of the pointer. The pointer is oscillated on its hinge by ring 61 (Figs. 13 and 14) adapted to engage a projection 62 on the portion 60 of the pointer but which normally is held out of engagement therewith. Ring 61 is in this instance mounted upon and forms a part of bell crank lever 63 pivoted at 64 and connected at 65 to an operating solenoid 66 which when energized causes the lever to engage projection 62 and to tilt the pointer to bring contacts 55, etc. in electrical contact with contacts 54.

Contacts 54 in this instance comprise three series of contacts,—one series 67 controlling the "hundreds" digit in the weight, another series 68 the "tens" digit, and another series 69 the "units" digit. The scale in this instance having a capacity of a plurality of thousand pounds, a series 67 of "hundreds" contact are provided for each thousand pounds per scale capacity. Similarly, a series 68 and 69 of "units" and "tens" contacts are provided for each of the "hundreds" contacts 67. The illustrative scale has a capacity of 15,000 pounds with a "unit" weight of 25 pounds, that is, the smallest recorded increment of weight is 25 pounds. The "units" and "tens" contact series 68 and 69 need therefore be designed to effect the printing of only four different sets of "units" and "tens" digits, namely, "00", "25", "50" and "75". For a scale having a different capacity and different unit weights, the "units" and "tens" contact series would be appropriately changed.

To increase the circumferential lengths of the individual contacts particularly of the "units" and "tens" series, contact arm 52 is given a range of movement of three revolutions, thus traversing the entire series of contacts once for each 5,000 pounds of load. In this arrangement there are therefore five sets of "hundreds" contacts 67.

The arrangement of the "units", "tens", and "hundreds" contacts is more clearly illustrated in the diagram of Fig. 19 in which, for the purpose of enlargement of scale, only a single set of "hundreds" contacts 67 are shown and these have been distributed throughout a complete circle instead of being confined to one-fifth of a circle in the actual machine as illustrated in Fig. 9. It will be understood that in the actual embodiment illustrated in Fig. 9, there will be five sets of contacts (as arranged in Fig. 19) extending around the circumference of the dial. As shown in Fig. 19, the "hundreds" series of contacts 67 are successively arranged from "1" to "9" and offset radially so that the end of one contact is in radial alignment with the beginning of the next. Contact of the "hundreds" contact member 57 with one of the "hundreds" contacts is therefore insured, and as will presently appear, contact with two adjoining contacts 67 will not produce an erroneous record. In the present instance there is no zero contact since in the illustrative apparatus, as presently explained, a "0" will be recorded whenever no other contact is made. It should be noted (Fig. 11) that the "hundreds" contact finger 57 and also the "tens" and "units" contact fingers 56 and 55 are given such radial length as to embrace the aggregate radial offset of the contacts.

Within the angle embraced by each of the "hundreds" contacts 67 is a complete series of "tens" and "units" contacts 68 and 69. As explained above, the first two variable digits of the weight which in this instance are the "tens" and "units" digits of the weight, are limited to "00", "25", "50" and "75", these sufficing where the unit weight increment is 25 pounds. Therefore, extending throughout the angle embraced by each of the "hundreds" contacts and each covering one-quarter of such angle, are three sets of contacts 68 and 69 representing and marked respectively "25", "50" and "75". No "tens" or "units" contacts occupy the angle marked "00" and embracing the "00" reading in the first quarter of the "hundreds" contact, since, as stated above, zero is automatically recorded if no other "tens" or "units" contacts respectively be made.

In this connection it should be understood that if the unit increment of weight be in excess of 100 pounds, i. e., 250 pounds (in the case of large capacity scale, say of 150,000 pounds or more), the "ones" or terminal digit of the weight will always be zero. Since the "ones" digit is invariably zero, it may be recorded independently of the foregoing recording mechanism simply by arranging to print a terminal zero following the variable digits controlled by the recording mechanism itself.

As will presently appear, the arm 52 and the respective "hundreds", "tens" and "units" contacts 67, 68, and 69 are connected in circuits which control the mechanism for printing and recording the "hundreds", "tens" and "ones" digits (or the first three variable digits) of the weight.

The recording of the "thousands" and higher order digits of the weight may advantageously be controlled directly from some portion of the lever system of the apparatus since the movement represented by an increment of 1,000 pounds is so substantial that it requires no mechanism for multiplying it, as is the case with the "units", "tens" and "hundreds" digits, to satisfy requirements of design. In the present instance the aforesaid control is effected from the tare beam whose extremity is provided with a flexible tip 80 which traverses normally without contact therewith, a series of contacts 81 and 82 (Figs. 15, 16 and 19) connected in circuits for actuating the printing and recording of the "thousands" and "ten thousands" digits (Fig. 19). To complete a circuit, it is necessary to flex the extremity 80 of the beam into contact with the aforesaid contact elements. This is effected in this instance after the beam has come to rest in counterbalancing a load, by a bar 83 normally held out of contact with the beam extremity 80 by springs 84. The bar actuating mechanism is here shown in the form of a pair of reciprocating cams 85, actuated by solenoid 86, and which by engagement with the cam pins 87 move the bar laterally to effect electrical contact of the extremity 80 with the contacts 81 and 82.

The series of contacts 81 represent the "thousands" digits which in the case of a scale having a capacity up to 15,000 pounds, comprise the digits from "1" to "9" covering weights up to 10,000 pounds and a continuing series of digits from "0" to "4" covering weights from 10,000 to and including 14,000 pounds. Opposite the latter series of digits is the contact 82 which controls the "ten thousands" digit "1". When the position of the beam represents weights from 10,000 pounds up, it traverses both contact 82 and the last five contacts 81 and, when in engagement therewith, completes circuits both through the contact 82 (which controls the "ten thousands" digit) and through the contacts 81 which control respectively the last five of the "thousands" digits in weights from 10,000 pounds and higher.

Figure 18:
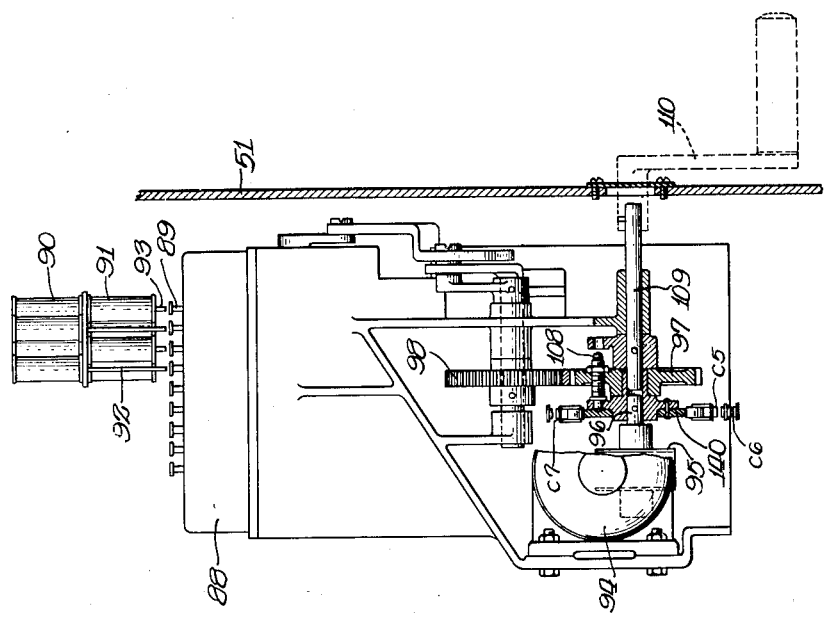
Fig. 18 is an end elevation, partly in section, of the recording apparatus shown in Fig. 17.

As in the case of the "hundreds", "tens" and "units" digits, no contact is necessary for the zero digit in the "thousands" and "ten thousands" orders, "0" being recorded if and when no other digit of that order is recorded. Furthermore, as will presently appear, the arrangement is such that if the contact arm engages two adjacent contacts, the lower of the two digits will be printed and recorded. This does not apply in the case of "zero" which has no control contact and is printed only when no other digit is actuated. Hence if the arm 52 engage a "1" contact, "1" will be printed and not "0". These results automatically ensue, if, as in the present case, a conventional adding machine 88 (Figs. 17 and 18) be employed as a printing and recording mechanism; it may also advantageously serve to totalize the successively recorded weights. A wide variety of adding machines may be employed and their details form no part of this invention. It should be understood that it is characteristic of adding machines of this type that the extent of advance of the digit slide of each order determines the digit of that order, a minimum or zero advance setting up "0" and a maximum advance setting up "9". The keys 89 serve as the stops for setting the digit slides, although other means may be employed. Also if no key 89 in the given order of digits be depressed, there will be a zero or minimum advance of the digit slide and "0" will be recorded and printed for that order of digits. If two keys of a given order should be depressed, only the digit controlled by the lower key of that order will be printed. This is also inherent in adding machines of this type; and if more than one key in a given order be depressed, the digit slide will be stopped and set by the lower key, the other depressed keys having no influence on the setting.

Key actuating means are here shown in the form of solenoids 90 and 91 whose armature pins 92 and 93 are projected upon energization of the solenoid to depress the key controlled thereby. To adapt the solenoids to the conventional key spacing, they are alternated in upper and lower series 90 and 91 (see Figs. 17 and 18), the armature pins 92 of the upper series being elongated to pass between solenoids of the lower series. The foregoing solenoids are respectively connected in presently described circuits controlled by the aforesaid "ones", "tens", "hundreds", etc. contacts 67, 68, 69, 81, and 82.

The adding machine is actuated to record and totalize a given weight and subsequently to restore the depressed keys following such record, by electric motor 94 connected through speed reducing means 95 to shaft 96 which drives gears 97 and 98. The latter reciprocates through its crank 99, links 100 and 101, each of which are provided with slots of appropriate length to limit the amplitude of oscillation. Link 100 oscillates the adding machine crank 102 which performs the foregoing conventional adding machine operations. Link 101 operates the paper feeding mechanism which periodically advances the record tape 103 after each record is printed thereon, unwinding it from roll 104 and winding it upon roll 105. The paper advancing mechanism actuated by link 101 is shown at 106. It may be of any appropriate form and its details therefore need not be described. The tape 103 advantageously passes across a table 107 to be conveniently exposed to receive other records or notations which may be written or printed opposite a given weight record.

If for any reason hand operation of the adding machine should be desirable, a slidable pin clutch 108 is provided by which gear 97 may be selectively connected either to motor shaft 96 or hand shaft 109 to the end of which a crank 110 may be applied.

The illustrative apparatus is in this instance also equipped with visual weight indicating means in the form of pointers and dials which serve visually to indicate the weight. As here shown, the contact arm 52 is made in the form of a pointer which traverses a scale 111 on the outer margin of dial 53. This scale is graduated to hundreds of pounds and comprises five sets of similar graduations which indicate weights up to 1,000 pounds, that is, embraces the first three variable digits of the weight. Unit graduations in this instance correspond with that of the recording apparatus and represent 25 pound increments. Therefore each 100 pounds is subdivided in four 25 pound units representing "00", "25", "50" and "75".

The higher weight units, i. e. "thousands" and "ten thousands", are indicated by a separate pointer 112 which in this instance is concentric with pointer 52 but of shorter length and traverses a circular scale 113 on dial 53 but of smaller diameter than scale 111. The latter scale comprises a series of simple graduations representing the successive "thousands" digits from "0" to and including 14,000 pounds. This scale need not and, in this case, does not extend around the entire circumference of the dial. The graduations are so large as to allow a much shorter scale. A visual reading of the weight therefore requires a combination of the indications of the two pointers 52 and 112. For example, as illustrated in Fig. 9, the pointer 112 lies between the "7,000" and "8,000" graduations and the pointer 52 lies on the graduation which represents "950". Therefore the weight indicated is "7,950" pounds.

Pointer 112 in this instance is actuated by power means which is separate and independent of the scale lever system and therefore imposes no resistance thereon. As here shown the pointer shaft is provided with a pulley 114 which is driven from reversible motor 115 through belt 116. Driving pulley 117 is connected through worm or other reduction gearing to the motor so as to revolve slowly relative to the motor. One face of the pointer carries a contact element 118 which travels over a series of mutually insulated segmental contacts 119 (see Fig. 12) representing and corresponding to the respective "thousands" graduations on dial 113. Preferably a continuous circular contact 119, insulated from the ground up also engaged by moving contact 118, is used in the return circuit instead of grounding pointer 112. The respective contacts 119 are connected in circuits (see Fig. 19) which include contacts 81 and 82 for controlling the operation of motor 115, to cause the same to stop in a position corresponding to that assumed by the beam extension 80 which represents the "thousands" digit in the weight of the load.

As will presently appear (Fig. 19), those contacts 81, which control the thousands digits "1", "2", "3", and "4" respectively in the numbers 1,000, 2,000, 3,000, 4,000, and 11,000, 12,000, 13,000, and 14,000 are respectively connected in parallel with the corresponding thousands key controlling solenoid 91 or 92. For example, each of the "1" contacts is connected to the "1" key controlling solenoid (see Fig. 19). However, since the contacts 81 are used also for controlling the pointer 112, it is necessary, in order to insure proper location of pointer 112, to provide a separate set of contacts 120 corresponding to "0000", "1000", "2000", "3000", "4000" for controlling the position of pointer 112 if the weight of the load is below 5000 pounds.

The operation of the controlling circuits may be readily understood by reference to the diagram of Fig. 19. Therein the sets of solenoids for controlling the "units", "tens", "hundreds", "thousands" and "ten thousands" keys of the adding machine are respectively designated as U, T, H, TH and T.TH. The "hundreds", "tens" and "units" solenoids are respectively connected by wires 121 to the appropriate "hundreds", "tens" and "units" contacts 67, 68, and 69. The "thousands" key solenoids and the "ten thousands" solenoid (there being only one "ten thousands" solenoid in this instance since the "ten thousands" digit never exceeds "1") are connected by wires 122 to the corresponding contacts 81. It will be noted that wires 123 connect the last five contacts 81 representing the thousands digits "1", "2", "3", and "4" in the numbers 11,000, 12,000, 13,000, and 14,000, in parallel with the corresponding first four contacts 81 representing the thousands digits in 1,000, 2,000, 3,000, and 4,000. Thus the solenoids controlling the "1", "2", "3", "4" "thousands" keys are respectively energized when a circuit is established through either of the contacts 81 representing respectively "1", "2", "3", "4". This arrangement of circuits adapts the mechanism to the conventional adding machine wherein each of the four "thousands" keys "1", "2", "3" or "4" are used twice in traversing the entire capacity of the scale, i. e. 0 to 15,000 pounds. For example, the "thousands" digit "2" will appear both in a weight of 2,000 pounds and 12,000 pounds.

When the load equals 10,000 pounds or more the load responsive member (contact arm 80 in this case) will have moved within the range of contact 82 which controls the printing of the ten thousands digit "1", contact 82 being connected (see Fig. 19) to control the "ten thousands" "1" key solenoid.

It will be further noted that in the present arrangement with a unit weight increment of 25 pounds, only a single "units" solenoid is required, that for controlling the unit "5" key, "0" being printed, as explained above, if the unit "5" key be not depressed. Only three "tens" solenoids T are required, those for actuating the "2", "5" and "7" "tens" keys, the "tens" "0" digit being automatically printed and recorded unless one of the aforesaid "tens" keys be depressed. A solenoid is required for each of the keys from "1" to "9" in the "hundreds" and "thousands" orders or banks of keys, the "hundreds" and "thousands" "0" digit being respectively printed if no other "hundreds" or "thousands" key be depressed.

The operation of the apparatus may be readily understood by a study of the diagram of Fig. 19. When a load is placed upon the scale, pointer 52 and extension contact 80 are moved to positions which represent the weight of the load. Thereupon motor 115 is started to drive pointer 112 to a position corresponding to that assumed by extension 80 in which position it is arrested by controlling circuits presently described; and the pointer solenoid 66 is energized to cause the pointer to make circuits through those contacts 67, 68, and 69 which it engages. For example, in the diagram of Fig. 19, the pointer engages "hundreds" contact "100" and "tens" and "units" contacts "25". Thereupon the corresponding "hundreds", "tens" and "units" key controlling solenoids are energized to depress the keys controlled thereby and the proper "thousands" and "ten thousands" key controlling solenoids are energized by the circuits established by the correlated positions of beam contact 80 and pointer 112 which has been brought to rest in the position corresponding to pointer contact 80. Such position in the present illustration corresponds to "11,000", and effects the energization of the "ten thousands" "1" digit and the "thousands" "1" digit. The illustrative weight thereby recorded and set up in the adding machine is therefore 11,125 pounds.

In the diagram of Fig. 19 is illustrated one arrangement of controlling circuits for effecting the aforesaid sequence of operations. A timing device T, in this instance comprising a simple slow speed synchronous motor of the type used for electric clocks, may be used if necessary to insure a proper interval between the placing of a load upon the scale and the actuation of the recording mechanism for allowing the scale to come to perfect balance. In this instance the timer drives a switch actuating cam 130 carrying a notch 131 by which switches TS1 and TS2 are periodically closed and opened.

As here shown, push button PB controls the circuit to timer T. Let us assume therefore that push button PB has been momentarily depressed either simultaneously with or at any time after the placing of a load upon the scale. Timer T thereupon rotates its cam 130, forcing the switch member 132 out of notch 131, closing contacts TS1 and opening contacts TS2. The former contacts establish a circuit from the line through coil R1 of a locking relay 133. The latter relay is of a type which is readily available on the open market and comprises two alternately acting solenoids, R1 and R2, which alternately close and open switch contacts C1 and C2. The relay is provided with a toggle arm 134 connected to the respective solenoid cores and a spring 135 which serves to hold the relay in the position assumed by the energization of one of its relays even after the circuit through that relay has been open. This position is not shifted until the other solenoid is energized. Therefore when, as stated above, solenoid R1 is energized by a circuit established through the line (i. e. the source of electric power), contacts C1 and C2 are closed and remain closed, regardless of the opening of contacts TS1, until the solenoid R2 is energized, in which event contacts C1 and C2 remain open until R1 is again energized. The circuit established through contacts C1, which are in series with contacts TS1, includes the timer motor T and therefore maintains it in operation even though push button PB may be released. It is therefore necessary simply momentarily to depress push button PB to start the motor in operation and to maintain it in operation until the latter circuit has been broken. This occurs upon a complete revolution of cam 130 which is designed to allow ample time for the scale to come to balance. When switch member 132 again falls in notch 131, contacts TS1 are opened and contacts TS2 are closed. The opening of the former stops motor T and the closing of the latter sets up a circuit through contacts C2 resulting in the following operations:

The pointer rocking solenoid 66 and the beam contacting solenoid 86 are simultaneously energized by parallel circuits which reach the line through contacts C2 and TS2. The energization of these solenoids causes the pointer 52 and beam extension 80 to engage the contacts opposite their position.

When pointer 52 makes the aforesaid contacts, connections are made which establish a plurality of parallel circuits including the pointer 52 and its ground connection, the corresponding "units", "tens" and "hundreds" key controlling solenoids 91 and 92, the contacts C9, C2, TS2 and the line. The foregoing key controlling solenoids are therefore energized to depress the keys controlled thereby.

The engagement of beam contact 80 (which is here shown grounded) with contacts 81 or 81 and 82, establishes circuits which include the grounded beam, wires 122 or 123, the corresponding "thousands" key operating solenoids and the "ten thousands" key operating solenoid (if contact 82 be engaged), contacts C9, C2 and TS2, and the line. The appropriate "thousands" key and (if the weight be at least 10,000 pounds) the "1" "ten thousands" key are thereby depressed. Upon energization of the adding machine operating motor 94, as presently explained, the digits set by the depressed keys are thereupon carried into the adding machine and recorded.

For operating the indicating pointer 112, a circuit is also established through contacts C3 to the motor 115 which is actuated to rotate the pointer 112 in a clockwise direction. Contacts C3 are controlled by the locking relay 136 and remain normally closed when the solenoid is deenergized. Upon energization of the latter, contacts C3 are opened and C4 closed. Motor 115 also drives switch operating cam 137 on the shaft of pointer 112. As cam 137 rotates its lobe, 138 clears switch member 139, thereby opening contacts C9 and closing contacts C10. Opening of contacts C9 deenergizes key solenoids 91 and 92 which require only momentary operation (the keys, of course, remaining depressed until completion of the adding machine cycle), and are thereby protected against overheating which might result from prolonged energization. It should be understood that before this occurs, the key controlling solenoids have already been depressed and the breaking of the circuits by opening the contacts C9 deenergizes these solenoids.

When the indicator arm 112 has rotated until it engages the contact corresponding to that engaged by beam contact 80, a circuit is established from the line through contacts TS2, C2, solenoid 136, pointer 112, one of the contacts 119, to the corresponding contact 81 or 120 through beam contact 80 to return contact 119'. It should be noted that such circuit is not established until arm 112 engages the contact corresponding to that engaged by beam contact 80. The circuit thus established energizes relay 136, opening contacts C3 and closing contacts C4. Opening of contacts C3 immediately stops the pointer driver motor 115, leaving the motor in a position to indicate the correct "thousands" digit. It should be noted that it is immaterial if the motor and pointer 112 travel slightly beyond the dial graduation representing the correct "thousands" digit since it is sure to stop long before it reaches the next higher "thousands" digit, and any intermediate position will of course be understood to represent the lower digit immediately adjacent the pointer.

The closing of contacts C4 energizes adding machine operating motor 94 by a circuit which includes the latter motor with its ground connection, contacts C4, C2, TS2 and the line. The motor thereupon operates the adding machine as aforesaid and at the same time rotates switch operating cam 140 mounted on shaft 96. Cam 140 makes one complete revolution during the operation of the adding machine. It controls two sets of switches, C—5, C—6 and C—7, angularly separated by 180° on the cam. In starting position, switch member 142 lies in an elongated notch 144, with contacts C—5 and C—6 open, and switch member 143 is on the high portion of the cam, with contacts C—5 open. Upon partial rotation of cam 140, the switch member 142 reaches the high portion of the cam successively closing contacts C—5 and then contacts C—6. The circuit established through contacts C—5 now drives motor 94, and the circuit established through contacts C—6 energizes locking relay R—2, opening contacts C—1 and C—2. The successive closing of contacts C—5 and C—6 provides a short interval of time before closing of these contacts to insure the establishment of a circuit to motor 94 before the original circuit to the motor is broken at contacts C—2.

While contacts C—7 are closed (i. e., while switch member 143 is in notch 144) an auxiliary circuit from the line through contacts C—7, C—8 and C—5 is established through motor 94. The latter circuit is effective only while contacts C—7 remain closed.

The opening of contacts C—2 deenergizes solenoids 66 and 85.

The active portion of the adding machine cycle is completed during the first half revolution of cam 140, after which the notch or low point 144 on cam 140 reaches switch member 143, resulting in the closing of contacts C—7. This establishes a circuit through relay 145, reversing motor 115, causing it and pointer 112 to rotate in a counterclockwise direction (the line for such circuit being marked C—C).

It should be noted that contacts C—10 are still closed and are included in the motor reversing circuit. The energization of relay 145 closes contacts C—8, which maintains the motor-reversing circuit, the circuit in this case including contacts C—8 and C—10. The same contacts also provide a parallel circuit to maintain coil 145 in energized condition, even though contacts C—7 have been subsequently broken by continued rotation of cam 140.

Adding machine operating motor 94 continues its rotation until switch operating member 142 falls in the depression 144 of cam 140, thereby opening contacts C5 and C6. The opening of the former breaks the circuit through motor 94 and the opening of the latter deenergizes relay coil R—2 but of course the contacts C1 and C2 remain open. The depression 144 is made of sufficient length so that even though motor 94 coasts slightly after the breaking of its circuit, it will not rotate cam 140 far enough again to close contacts C5 and C6.

The cycle ends with switch member 142 in depression 144 with contacts C5 and C6 open. Cam lobe 138 is also of sufficient length so that it will not clear switch member 139 after opening of the circuit through motor 137. Therefore the cycle ends with contacts C9 closed and contacts C10 opened.

Referring now to the reverse rotation of motor 115, when the indicator pointer 112 reaches the "0" position, cam lobe 138 will engage switch member 139, opening contacts C10 and closing contacts C9. The opening of the former breaks the reversing circuit through motor 115, stopping the motor and also deenergizing solenoid 145 to open contacts C8. It should be noted that it is immaterial whether contacts C10 open before contacts C7, as might be the case if the motor 115 has a very short return travel, since contacts C10 control the motor-reversing circuit.

It should be noted that if beam contact 80 comes to rest on either of the first four contacts 81, completion of the circuit to control arm 112 requires also an opposite contact 120. This insures positioning of pointer 112 in a "1000," "2000," "3000," or "4000" position instead of a "11,000," "12,000," "13,000," or "14,000," as the case may be, even though the same "thousands" key must be depressed whether the weight is, for example, 2,000 pounds or 12,000 pounds.

It is evident from the foregoing that the adding machine or other recording and printing mechanism may be located at a point remote from the scale or indeed a plurality of adding machines or recorders may be operated in parallel. Only a relatively few wires, in this instance about 30 including the power line but not including any ground connections, are required to extend from the apparatus to the recording device. This imposes no substantial obstacle either in the way of complication of circuits or in the location of recording mechanism at a remote point if that be desired.

It is apparent that the foregoing circuits and the elements controlled thereby supplant expensive mechanical devices which have heretofore been required to set the printing and recording mechanism.

Obviously the invention is not limited to the details of the illustrative embodiment since these may be variously modified. Moreover it is not indispensable that all features of the invention be used conjointly since various features may be used to advantage in different combinations and sub-combinations.

Having described my invention, I claim:

1. A recording scale of the character described comprising in combination, a load responsive dial pointer adapted to rotate a plurality of revolutions in traversing the entire capacity of the scale, each revolution representing an integral number of large units of weight, another load responsive member adapted to be moved to a position representing the weight of the load, recording mechanism including weight printing devices for printing the several orders of digits on the weight of the load, electrically actuated means for controlling the positioning of the respective orders of digits, electrical contacts traversed by said load responsive member, each contact representing a large unit of weight in the capacity of the scale and being electrically connected with the respective electrically actuated means relating to the order of digits of said large units of weight, other contacts associated with said pointer and electrically connected with the electrically actuated means for controlling the lower orders of digits, and means for bringing said pointer and load responsive member into engagement with said contacts after the former are in equilibrium to energize circuits controlling the digits on the weight of the load represented by said pointer and load responsive means respectively.

2. A scale of the character described comprising in combination, a load responsive member having a range of travel of a plurality of revolutions in traversing the capacity of the scale, electrical contacts traversed by said member and representing a range of loads equivalent to a single revolution of said member, electrically actuated printing mechanism having controlling circuits connected with said contacts, means for energizing the circuits through the contacts in register with said member to print the load represented by fractional revolutions of said member, and separate means for energizing the printing mechanism to record the load represented by whole revolutions of said member.

3. A scale of the character described comprising in combination, a load responsive member having a range of travel of a plurality of revolutions in traversing the capacity of the scale, electrical contacts traversed by said member and representing a range of loads equivalent to a single revolution of said member, electrically actuated printing mechanism having controlling circuits connected with said contacts, means for energizing the circuits through the contacts in register with said member to print the load represented by fractional revolutions of said member, a load responsive device movable to positions representing load corresponding to displacements of whole revolutions of said member, and other circuits controlled by the position of said device for energizing said printing mechanism to record the load represented by the position of said device.

4. A scale of the character described comprising in combination, a load responsive member having a range of travel of a plurality of revolutions in traversing the capacity of the scale, each revolution representing a simple fraction of the capacity of the scale, electrically actuated recording mechanism controlled by the position of said member for recording the load represented by a fractional revolution of said member, a load responsive device movable to a position representing the weight of a load, a series of contacts traversed by said device, said contacts representing load in excess of that represented by the load responsive member, circuits connecting said contacts with said recording mechanism, and means for completing a circuit through the contact in register with said device to energize said recording mechanism to record portion of the load in excess of that represented by said load responsive member.

5. A recording scale of the character described comprising in combination a load responsive member, a dial pointer actuated thereby and having a range of travel of a plurality of revolutions in traversing the capacity of the scale, a series of subjacent contacts normally out of contact with said pointer and having a range corresponding to a fraction of the capacity of the scale, recording mechanism controlled by electric circuits through said contacts for recording the digits in the weight of the load represented by such fraction of the capacity of a scale, an indicator for indicating multiples of said fraction, and means controlled by the position of said load responsive member for actuating said indicator.

6. A scale of the character described comprising in combination a load responsive member, weight indicating pointer connected thereto and having a range of travel of a plurality of revolutions in traversing the capacity of the scale, a dial associated with said pointer for indicating loads represented by a fraction of a revolution of said pointer, an indicator for indicating the load represented by one or more revolutions of said load responsive member, separate power mechanism independent of the power of said load responsive member for moving said indicator, means normally out of contact with said load responsive member for actuating said power mechanism to set said indicator in position to indicate the load represented by complete revolutions of said pointer, and means for effecting a momentary operative contact with said load responsive member after the latter has come to load balance position for controlling the setting of said indicator.

7. A recording scale of the character described comprising in combination, recording mechanism having printing elements for printing the several digits in the weight of a load, electric circuits controlling the actuation of said recording mechanism for printing the aforesaid digits, a load responsive dial pointer, a series of subjacent contacts normally out of contact with said pointer, said contacts representing the digits in a denominational order in the weight of a load and being connected with said pointer in said electric circuits, and means for deflecting said pointer momentarily into engagement with the contact opposite its position to energize the circuit representing the aforesaid digit in the weight of a load, said contacts having an angular separation of less than the width of the pointer, said recording mechanism having means operative to effect the printing of only the lower of two digits controlled by adjacent contacts both of whose controlling circuits are energized upon a given deflection of said pointer.

8. A recording scale of the character described comprising in combination a load responsive contact pointer, a series of subjacent electrical contacts normally out of contact with said pointer, weight recording mechanism for printing the several digits in the weight of the load and having electrically controlled means for controlling the printing of the several digits, said contacts being connected in circuits with the respective electrically controlled means and being arranged to represent the digits in the weight of the load at any given position of the pointer, and means for deflecting said pointer momentarily into engagement with the contacts opposite its position to energize those electrically controlled means connected with the contacts engaged, said contacts having substantially no angular separation so that in certain positions said pointer may contact with two adjacent contacts, said recording mechanism having means for causing the printing of only the lower of two actuated digits in a given denominational order whereby only said lower digit is recorded when said pointer lies opposite adjacent contacts of a given denominational order and completes a circuit through each of them.

9. A recording scale of the character described comprising in combination a load responsive contact pointer, a plurality of series of subjacent electrical contacts normally out of contact with said pointer and arranged opposite the path traversed by said pointer, each of said series representing a denominational order in the weight of the load, and each series comprising a plurality of adjacent contacts representing the several digits of each denominational order, weight recording mechanism for printing the several digits in the weight of the load, electric circuits connected with said contacts for controlling the actuations of said recording mechanism, and means for deflecting said pointer momentarily in engagement with the contacts opposite its weight indicating position to energize said weight recording mechanism to print the digits in the several denominational orders represented by the contacts engaged, the contacts in each series being arranged with substantially no angular separation so that in certain positions said pointer may make contact with two adjacent contacts, said recording mechanism having means for selectively printing only a predetermined one of two digits in a given denominational order represented by adjacent contacts, whereby only the said predetermined digit is recorded when said pointer lies opposite adjacent contacts and completes a circuit through each of them.

10. A scale of the character described comprising in combination a load responsive member, a weight indicating pointer connected thereto and having a range of travel of a plurality of revolutions in traversing the capacity of the scale, a dial associated with said pointer for indicating loads represented by a fraction of a revolution of said pointer, an indicator for indicating the load represented by one or more revolutions of said load responsive member, electric circuits controlled by said load responsive member, and independent power means actuated by said circuits and controlled by said load responsive member for moving said indicator to indicate the load represented by complete revolutions of said pointer.

OTTO P. HAEGELE.